(12) United States Patent
Moriguchi

(10) Patent No.: US 12,281,895 B2
(45) Date of Patent: Apr. 22, 2025

(54) VIBRATION-TYPE ANGULAR VELOCITY SENSOR

(71) Applicant: Sumitomo Precision Products Co., Ltd., Amagasaki (JP)

(72) Inventor: Takafumi Moriguchi, Amagasaki (JP)

(73) Assignee: Sumitomo Precision Products Co., Ltd., Amagasaki (JP)

( * ) Notice: Subject to any disclaimer, the term of this patent is extended or adjusted under 35 U.S.C. 154(b) by 271 days.

(21) Appl. No.: 17/913,954

(22) PCT Filed: Mar. 23, 2021

(86) PCT No.: PCT/JP2021/011906
§ 371 (c)(1),
(2) Date: Sep. 23, 2022

(87) PCT Pub. No.: WO2021/193600
PCT Pub. Date: Sep. 30, 2021

(65) Prior Publication Data
US 2023/0123765 A1 Apr. 20, 2023

(30) Foreign Application Priority Data
Mar. 24, 2020 (JP) .................. 2020-052440

(51) Int. Cl.
*G01C 19/567* (2012.01)
*G01C 19/56* (2012.01)
(Continued)

(52) U.S. Cl.
CPC ........... *G01C 19/567* (2013.01); *G01C 19/56* (2013.01); *G01C 19/5607* (2013.01);
(Continued)

(58) Field of Classification Search
CPC .............. G01C 19/567; G01C 19/5776; G01C 19/5719; G01C 19/56; G01C 19/5607; G01C 19/5649; G01C 19/5642
(Continued)

(56) References Cited

U.S. PATENT DOCUMENTS 10,161,751 B2 * 12/2018 Moriguchi ......... G01C 19/5677
11,982,532 B1 * 5/2024 Moriguchi ......... G01C 19/5755
(Continued)

FOREIGN PATENT DOCUMENTS

CN 108253952 A * 7/2018 ............. G01C 19/56
CN 115315612 A * 11/2022 ......... G01C 19/5726
(Continued)

OTHER PUBLICATIONS

Kline et al. Quadrature FM Gyroscope, Proceedings of the IEEE International Conference on Micro Electro Mechanical Systems (MEMS), MEMS 2013, Taipei, Taiwan, Jan. 20-24, 2013, pp. 604-608 (Year: 2013).*
(Continued)

*Primary Examiner* — Stephanie E Bloss
*Assistant Examiner* — Kevin C Butler
(74) *Attorney, Agent, or Firm* — Crowell & Moring LLP

(57) ABSTRACT

A vibration-type angular velocity sensor (100) includes a primary side control circuit (2) and a secondary side control circuit (3) which are configured so that a function as the primary side control circuit (2) and a function as the secondary side control circuit (3) are interchangeable, in which an offset value after interchange and an offset value before interchange are symmetric values with respect to a predetermined reference value.

15 Claims, 6 Drawing Sheets

(51) Int. Cl.
   *G01C 19/5607* (2012.01)
   *G01C 19/5642* (2012.01)
   *G01C 19/5649* (2012.01)
   *G01C 19/5719* (2012.01)
   *G01C 19/5776* (2012.01)
(52) U.S. Cl.
   CPC ..... *G01C 19/5642* (2013.01); *G01C 19/5649* (2013.01); *G01C 19/5719* (2013.01); *G01C 19/5776* (2013.01)
(58) Field of Classification Search
   USPC ...................................................... 73/504.12
   See application file for complete search history.

(56) References Cited

U.S. PATENT DOCUMENTS

| | | | | |
|---|---|---|---|---|
| 2008/0264168 | A1* | 10/2008 | Stewart | G01C 19/5677 73/504.13 |
| 2009/0173157 | A1* | 7/2009 | Stewart | G01C 19/5698 73/1.37 |
| 2013/0104653 | A1* | 5/2013 | Bernstein | G01C 19/5691 427/125 |
| 2016/0231118 | A1* | 8/2016 | Trusov | G01C 19/5726 |
| 2016/0377433 | A1* | 12/2016 | Moriguchi | G01C 19/5677 73/504.12 |
| 2023/0123765 | A1* | 4/2023 | Moriguchi | G01C 19/5726 73/504.12 |

FOREIGN PATENT DOCUMENTS

| | | | | | |
|---|---|---|---|---|---|
| JP | 2009115559 | A | * | 5/2009 | |
| JP | 6463335 | B2 | * | 1/2019 | ......... G01C 19/5677 |
| JP | 6761140 | B1 | * | 9/2020 | ......... G01C 19/5726 |
| JP | 2021152466 | A | * | 9/2021 | ........... G01C 19/567 |
| WO | WO-0179862 | A1 | * | 10/2001 | ......... G01C 19/5719 |
| WO | WO-2005075939 | A1 | * | 8/2005 | ......... G01C 19/5677 |
| WO | WO-2015129464 | A1 | * | 9/2015 | ......... G01C 19/5677 |
| WO | WO-2023037559 | A1 | * | 3/2023 | |

OTHER PUBLICATIONS

European Patent Office (EPO), European Search Report EP 21 77 4317, Jun. 10, 2024, p. 3 (Year: 2024).*
European Patent Office (EPO), European Written Opinion EP 21 77 4317 Form 1703, Jun. 10, 2024, p. 4 (Year: 2024).*
International Search Report (PCT/ISA/210) issued in PCT Application No. PCT/JP2021/011906 dated Jun. 15, 2021 with English translation (five (5) pages).
Japanese-language Written Opinion (PCT/ISA/237) issued in PCT Application No. PCT/JP2021/011906 dated Jun. 15, 2021 (three (3) pages).

* cited by examiner (a)

| TEMPERATURE (T) | T1 | T2 | ... |
|---|---|---|---|
| OFFSET VALUE (y) | y1 | y2 | ... |
| OFFSET VALUE (z) | z1 | z2 | ... |
| OUTPUT (x) OF PRIMARY SIDE CONTROL CIRCUIT | x1 | x2 | ... |

VIBRATION-TYPE ANGULAR VELOCITY SENSOR

TECHNICAL FIELD

The present invention relates to a vibration-type angular velocity sensor, and particularly to a vibration-type angular velocity sensor including a primary side control circuit that induces primary vibration in a vibrator, and a secondary side control circuit that detects and outputs secondary vibration generated in the vibrator due to an angular velocity applied to the vibrator.

BACKGROUND ART

In the related art, a vibration-type angular velocity sensor is known. The vibration-type angular velocity sensor is disclosed in, for example, Japanese Unexamined Patent Publication No. 2009-115559 and Japanese Patent No. 6463335.

In Japanese Unexamined Patent Publication No. 2009-115559, an element portion having a ring shape and a plurality of electrodes are arranged in a circumferential shape on the radial outer side of the element portion having a ring shape. The plurality of electrodes include a primary electrode and a secondary electrode. An AC power supply that generates primary vibration in the element portion having a ring shape is connected to one of the primary electrode and the secondary electrode by applying an AC voltage to one of the primary electrode and the secondary electrode. Further, detection means for detecting the magnitude of an electric signal generated in the other of the primary electrode and the secondary electrode is connected to the other of the primary electrode and the secondary electrode. Then, when rotational motion is generated in the normal direction of the element portion in a state in which the primary vibration is generated in the element portion having a ring shape, secondary vibration according to the angular velocity of the rotational motion is generated in the element portion. Then, the magnitude of the electric signal generated in the other of the primary electrode and the secondary electrode due to the secondary vibration is detected by the detection means connected to the other of the primary electrode and the secondary electrode. Further, the AC voltage for cancelling the secondary vibration is applied to one of the primary electrode and the secondary electrode based on the magnitude of the detected electric signal. Then, the magnitude of the angular velocity is operated based on the magnitude of the AC voltage for cancelling the secondary vibration.

Further, in the vibration-type angular velocity sensor according to the related art as disclosed in Japanese Unexamined Patent Publication No. 2009-115559, the angular velocity detected by the vibration-type angular velocity sensor includes a bias component (an error from a zero point output from a sensor even in a state in which the angular velocity is not added). The bias component is generated due to the asymmetry of a gyro element included in the vibration-type angular velocity sensor. Therefore, the vibration-type angular velocity sensor according to the related art such as Japanese Unexamined Patent Publication No. 2009-115559 is configured to switch between an electrode to which the AC power supply is connected (one of the primary electrode and the secondary electrode) and an electrode to which the detection means is connected (the other of the primary electrode and the secondary electrode). Then, the bias component is cancelled by differentiating the outputs of the vibration-type angular velocity sensor before and after switching.

Here, in the vibration-type angular velocity sensor as disclosed in Japanese Unexamined Patent Publication No. 2009-115559, which cancels the bias component by switching between the electrode to which the AC power supply is connected and the electrode to which the detection means is connected, there is a case where a bias component which remains without being cancelled is generated. In this case, the remaining bias component fluctuates depending on temperature of a surrounding environment.

Japanese Patent No. 6463335 discloses a vibration-type angular velocity sensor including a primary side control circuit that induces primary vibration in a vibrator, and a secondary side control circuit that detects and outputs secondary vibration generated in the vibrator due to an angular velocity applied to the vibrator. In the vibration-type angular velocity sensor, both the primary side control circuit and the secondary side control circuit are configured by a closed control loop. A first offset value based on the output of the primary side control circuit, which is inversely proportional to the temperature change of the gain of the vibrator, and a second offset value based on a constant signal independent of temperature are added to the closed control loop of the secondary side control circuit. As a result, an error caused by crosstalk from the primary side control circuit to the secondary side control circuit (an error inversely proportional to a first power and the square of the gain of the vibrator) is reduced. Note that, the first and second offset values are adjusted so as to reduce the error caused by the crosstalk from the primary side control circuit to the secondary side control circuit. As a result, the sensor output from the secondary side control circuit is corrected. As a result, it is possible to reduce the temperature fluctuation of an output from the vibration-type angular velocity sensor (an output value changes depending on temperature of the surrounding environments).

Then, by applying, before and after each of the switching, a configuration of Japanese Patent No. 6463335 to the vibration-type angular velocity sensor as disclosed in Japanese Unexamined Patent Publication No. 2009-115559, which cancels the bias component by switching between the electrode to which the AC power supply is connected and the electrode to which the detection means is connected, it is possible to reduce the temperature fluctuation of the remaining bias component.

CITATION LIST

Patent Literature

[PTL 1] Japanese Unexamined Patent Publication No. 2009-115559

[PTL 2] Japanese Patent No. 6463335

SUMMARY OF INVENTION

Technical Problem

However, as disclosed in Japanese Unexamined Patent Publication No. 2009-115559, in order to cancel the bias component by switching between the electrode to which the AC power supply is connected and the electrode to which the detection means is connected, the symmetry of the control of the vibration-type angular velocity sensor before and after the switching is important. Here, when the first and second offset values are set individually before and after the switching by applying the configuration of Japanese Patent No. 6463335 before and after the switching, generally, the first and second offset values are not symmetric before and after the switching. Therefore, when the first and second offset values that are not symmetric before and after switching are set, the symmetry of the control of the vibration-type angular velocity sensor is broken, so that there is a problem in that the temperature fluctuation component of a bias that remains without being cancelled becomes large.

The present invention has been made to solve the above-mentioned problems, and one object of the present invention is to provide a vibration-type angular velocity sensor which can suppress an increase in the temperature fluctuation component of the bias that remains without being cancelled.

Solution to Problem

In order to achieve the above object, according to a first aspect of the present invention, there is provided a vibration-type angular velocity sensor including a vibrator; a primary side control circuit that has a closed control loop, an output of the closed control loop inducing primary vibration in the vibrator; and a secondary side control circuit that has a closed control loop which detects secondary vibration generated in the vibrator due to an angular velocity applied to the vibrator, and is configured to correct a sensor output by adding an offset value to the closed control loop, in which the primary side control circuit and the secondary side control circuit are configured so that a function as the primary side control circuit and a function as the secondary side control circuit are interchangeable, and the offset value after interchange and the offset value before interchange are symmetric values with respect to a predetermined reference value.

In the vibration-type angular velocity sensor according to the first aspect of the present invention, as described above, the primary side control circuit and the secondary side control circuit are configured so that the function as the primary side control circuit and the function as the secondary side control circuit are interchangeable, and the offset value after interchange and the offset value before interchange are symmetric values with respect to the predetermined reference value. As a result, the offset values become symmetrical with respect to the predetermined reference value before and after the function as the primary side control circuit and the function as the secondary side control circuit are interchanged, so that it is possible to suppress symmetry of the control of the vibration-type angular velocity sensor before and after interchange from being broken. As a result, it is possible to suppress an increase in the temperature fluctuation component of a bias that remains without being cancelled.

In the vibration-type angular velocity sensor according to the first aspect, preferably, the primary side control circuit and the secondary side control circuit respectively include the primary side loop filter and the secondary side loop filter in the closed control loop, and are configured to correct the sensor output by adding the offset values to the input of the secondary side loop filter. Here, an output in the closed control loop corresponds to an output of the loop filter. Then, the output of the loop filter is inversely proportional to a gain of the vibrator dependent on temperature due to a feedback operation of the closed control loop. The present invention focuses on this point, and, by adding the offset value to the input of the secondary side loop filter, it is possible to reduce an error due to crosstalk inversely proportional to a first power and/or square of the gain of the vibrator.

In the vibration-type angular velocity sensor according to the first aspect, preferably, when the offset value before interchange is set to a, the offset value after interchange is −a in which a polarity of the offset value before interchange is reversed. With this configuration, the offset values become symmetrical with respect to zero before and after the function as the primary side control circuit and the function as the secondary side control circuit are interchanged, so that it is possible to suppress the symmetry of the control of the vibration-type angular velocity sensor before and after interchange from being broken.

In the vibration-type angular velocity sensor according to the first aspect, preferably, when a temporary offset value before interchange is set to a, a temporary offset value after interchange is set to −a, and a temporary offset value with respect to a median value of the sensor output before interchange and the sensor output after interchange is set to b, the offset value before interchange is a+b and the offset value after interchange is −a+b. With this configuration, the offset values become symmetrical with respect to b before and after the function as the primary side control circuit and the function as the secondary side control circuit are interchanged, so that it is possible to suppress the symmetry of the control of the vibration-type angular velocity sensor before and after interchange from being broken. Further, since the offset values before and after interchange are symmetrical with respect to the offset value b with respect to the median value of the sensor outputs before and after interchange, it is possible to suppress the symmetry of the control of the vibration-type angular velocity sensor before and after interchange from being broken while reducing a gradient of the residue of the bias component with respect to environmental temperature. Note that, "temporary" means an offset value in an intermediate stage until a final offset value is obtained.

In the vibration-type angular velocity sensor according to the first aspect, preferably, a configuration is made so that, when the sensor output is corrected in an analog manner, the sensor output is corrected by adding a first offset value based on the output of the primary side control circuit inversely proportional to a temperature change of a gain of the vibrator in order to correct the sensor output inversely proportional to a square of the temperature change of the gain of the vibrator from the secondary side control circuit and a second offset value based on a constant signal independent of temperature in order to correct the sensor output inversely proportional to the temperature change of the gain of the vibrator from the secondary side control circuit in the closed control loop of the secondary side control circuit, and by adjusting an addition amount of the first offset value and an addition amount of the second offset value. Here, when the second offset value based on the constant signal independent of temperature is added in the closed control loop of the secondary side control circuit, the output of the secondary side control circuit has a characteristic inversely proportional to the gain of the vibrator dependent on temperature. Further, similarly, the output of the primary side control circuit also has a characteristic inversely proportional to the gain of the vibrator due to the feedback operation of the closed control loop. Therefore, by adding the first offset value based on the output of the primary side control circuit 2 having the characteristic inversely proportional to the gain of the vibrator in the closed control loop of the secondary side control circuit, the output of the secondary side control circuit has the characteristic inversely proportional to the square of the gain of the vibrator. That is, the sensor output is corrected by adding the first offset value corresponding to the square of the gain of the vibrator and the second offset value corresponding to the first power of the gain of the vibrator and adjusting the addition amount of the first offset value and the addition amount of the second offset value, so that it is possible to perform correction inversely proportional to the first power of the gain of the vibrator and correction inversely proportional to the square of the gain of the vibrator.

In this case, preferably, a configuration is made so that, when the gain of the vibrator dependent on temperature is $G_R(T)$ and A, B, and C are constant values independent of temperature, a total $V_{Out\_Total\_Error}$ of an error of the sensor output generated in the closed control loop of the secondary side control circuit due to an error signal generated from a circuit block constituting the secondary side control circuit and an error of the sensor output generated in the closed control loop of the secondary side control circuit due to crosstalk from the primary side control circuit to the secondary side control circuit is expressed in the following Equation, and the sensor output is corrected in the analog manner by adjusting the addition amount of the first offset value based on the output of the primary side control circuit dependent on temperature inversely proportional to the temperature change of the gain of the vibrator so as to reduce $A/G_R^2(T)$ which is a first term of the following Equation and adjusting the addition amount of the second offset value based on the constant signal independent of temperature so as to reduce $B/G_R(T)$ which is a second term of the following Equation. With this configuration, it is possible to reduce both a primary (a first power of the gain of the vibrator) component and a secondary (square of the gain of the vibrator) component of the error of the sensor output, so that it is possible to surely increase the accuracy of correction. Note that, although the constant value C remains, C is the constant value independent of temperature. Therefore, the error of the sensor output due to the temperature change is not influenced, so that there is no problem in correction.

$$V_{Out\_Total\_Error} = A \cdot \frac{1}{G_R^2(T)} + B \cdot \frac{1}{G_R(T)} + C \quad [\text{Equation 3}]$$

In the vibration-type angular velocity sensor according to the first aspect, preferably, a configuration is made so that, when the sensor output is corrected in a digital manner, the sensor output is corrected by quantizing the output of the primary side control circuit dependent on temperature inversely proportional to a temperature change of a gain of the vibrator and by adding the offset value, which reduces an error of the sensor output due to the temperature change with respect to the quantized output of the primary side control circuit, to the secondary side control circuit. With this configuration, it is possible to correct the sensor output by only adding the offset value for reducing the error of the sensor output due to the temperature change to the secondary side control circuit, so that it is possible to simplify the configuration of the vibration-type angular velocity sensor unlike a case of adding an offset value other than the offset value based on the output of the primary side control circuit dependent on temperature.

In the vibration-type angular velocity sensor according to the first aspect, preferably, the vibrator includes a ring-type vibrator. Here, since the ring-type vibrator has a symmetrical shape, a vibration mode by the primary side control circuit and a vibration mode by the secondary side control circuit are similar. Therefore, when the present invention is applied to a vibration-type angular velocity sensor including the ring-type vibrator, it is not necessary to consider the influence of the difference in the vibration modes, so that it is possible to easily correct the sensor output.

According to a second aspect of the present invention, there is provided a vibration-type angular velocity sensor including a vibrator; a primary side control circuit that has a closed control loop, an output of the closed control loop inducing primary vibration in the vibrator; and a secondary side control circuit that has a closed control loop which detects secondary vibration generated in the vibrator due to an angular velocity applied to the vibrator, and is configured to correct a sensor output by adding an offset value to the closed control loop, in which a configuration is made so that a function of inducing the primary vibration and a function of detecting the secondary vibration are interchangeable, and the offset value after interchange and the offset value before interchange are symmetric values with respect to a predetermined reference value.

As described above, the vibration-type angular velocity sensor according to the second aspect of the present invention is configured so that the function of inducing the primary vibration and the function of detecting the secondary vibration are interchangeable, and the offset value after interchange and the offset value before interchange are symmetric values with respect to the predetermined reference value. As a result, the offset values are symmetrical with respect to the predetermined reference value before and after the function of inducing the primary vibration and the function of detecting the secondary vibration are interchanged, so that it is possible to suppress the symmetry of control of the vibration-type angular velocity sensor before and after interchange from being broken. As a result, it is possible to suppress an increase in the temperature fluctuation component of a bias that remains without being cancelled.

In the vibration-type angular velocity sensor according to the second aspect, preferably, the primary side control circuit and the secondary side control circuit respectively include a primary side loop filter and a secondary side loop filter in the closed control loop, and are configured to correct the sensor output by adding the offset values to an input of the secondary side loop filter. Here, an output in the closed control loop corresponds to an output of the loop filter. Then, the output of the loop filter is inversely proportional to a gain of the vibrator dependent on temperature due to a feedback operation of the closed control loop. The present invention focuses on this point, and, by adding the offset value to the input of the secondary side loop filter, it is possible to reduce an error due to crosstalk inversely proportional to a first power and/or square of the gain of the vibrator.

In the vibration-type angular velocity sensor according to the second aspect, preferably, when the offset value before interchange is set to a, the offset value after interchange is −a in which a polarity of the offset value before interchange is reversed. With this configuration, the offset values become symmetrical with respect to zero before and after the function as the primary side control circuit and the function as the secondary side control circuit are interchanged, so that it is possible to suppress the symmetry of the control of the vibration-type angular velocity sensor before and after interchange from being broken.

In the vibration-type angular velocity sensor according to the second aspect, preferably, when a temporary offset value before interchange is set to a, a temporary offset value after interchange is set to −a, and a temporary offset value with respect to a median value between the sensor output before interchange and the sensor output after interchange is set to b, the offset value before interchange is a+b, and the offset value after interchange is −a+b. With this configuration, the offset values become symmetrical with respect to b before and after the function as the primary side control circuit and the function as the secondary side control circuit are interchanged, so that it is possible to suppress the symmetry of the control of the vibration-type angular velocity sensor before and after interchange from being broken. Further, since the offset values before and after interchange are symmetrical with respect to the offset value b with respect to the median value of the sensor outputs before and after interchange, it is possible to suppress the symmetry of the control of the vibration-type angular velocity sensor before and after interchange from being broken while reducing a gradient of the residue of the bias component with respect to environmental temperature. Note that, "temporary" means an offset value in an intermediate stage until a final offset value is obtained.

In the vibration-type angular velocity sensor according to the second aspect, preferably, a configuration is made so that, when the sensor output is corrected in an analog manner, the sensor output is corrected by adding a first offset value based on the output of the primary side control circuit inversely proportional to a temperature change of a gain of the vibrator in order to correct the sensor output inversely proportional to a square of the temperature change of the gain of the vibrator from the secondary side control circuit and a second offset value based on a constant signal independent of temperature in order to correct the sensor output inversely proportional to the temperature change of the gain of the vibrator from the secondary side control circuit in the closed control loop of the secondary side control circuit, and by adjusting an addition amount of the first offset value and an addition amount of the second offset value. Here, when the second offset value based on the constant signal independent of temperature is added in the closed control loop of the secondary side control circuit, the output of the secondary side control circuit has a characteristic inversely proportional to the gain of the vibrator dependent on temperature. Further, similarly, the output of the primary side control circuit also has a characteristic inversely proportional to the gain of the vibrator due to the feedback operation of the closed control loop. Therefore, by adding the first offset value based on the output of the primary side control circuit 2 having the characteristic inversely proportional to the gain of the vibrator in the closed control loop of the secondary side control circuit, the output of the secondary side control circuit has the characteristic inversely proportional to the square of the gain of the vibrator. That is, the sensor output is corrected by adding the first offset value corresponding to the square of the gain of the vibrator and the second offset value corresponding to the first power of the gain of the vibrator and adjusting the addition amount of the first offset value and the addition amount of the second offset value, so that it is possible to perform correction inversely proportional to the first power of the gain of the vibrator and correction inversely proportional to the square of the gain of the vibrator.

In this case, preferably, a configuration is made so that, when the gain of the vibrator dependent on temperature is $G_R(T)$ and A, B, and C are constant values independent of temperature, a total $V_{Out\_Total\_Error}$ of an error of the sensor output generated in the closed control loop of the secondary side control circuit due to an error signal generated from a circuit block constituting the secondary side control circuit and an error of the sensor output generated in the closed control loop of the secondary side control circuit due to crosstalk from the primary side control circuit to the secondary side control circuit is expressed in the following Equation, and the sensor output is corrected in the analog manner by adjusting the addition amount of the first offset value based on the output of the primary side control circuit dependent on temperature inversely proportional to the temperature change of the gain of the vibrator so as to reduce $A/G_R^2(T)$ which is a first term of the following Equation and adjusting the addition amount of the second offset value based on the constant signal independent of temperature so as to reduce $B/G_R(T)$ which is a second term of the following Equation. With this configuration, it is possible to reduce both a primary (a first power of the gain of the vibrator) component and a secondary (square of the gain of the vibrator) component of the error of the sensor output, so that it is possible to surely increase the accuracy of correction. Note that, although the constant value C remains, C is the constant value independent of temperature. Therefore, the error of the sensor output due to the temperature change is not influenced, so that there is no problem in correction.

$$V_{Out\_Total\_Error} = A \cdot \frac{1}{G_R^2(T)} + B \cdot \frac{1}{G_R(T)} + C \qquad \text{[Equation 4]}$$

In the vibration-type angular velocity sensor according to the second aspect, preferably, a configuration is made so that, when the sensor output is corrected in a digital manner, the sensor output is corrected by quantizing the output of the primary side control circuit dependent on temperature inversely proportional to a temperature change of a gain of the vibrator and by adding the offset value, which reduces an error of the sensor output due to the temperature change with respect to the quantized output of the primary side control circuit, to the secondary side control circuit. With this configuration, it is possible to correct the sensor output by only adding the offset value for reducing the error of the sensor output due to the temperature change to the secondary side control circuit, so that it is possible to simplify the configuration of the vibration-type angular velocity sensor unlike a case of adding an offset value other than the offset value based on the output of the primary side control circuit dependent on temperature.

Advantageous Effects of Invention

According to the present invention, as described above, it is possible to suppress an increase in the temperature fluctuation component of the bias that remains without being cancelled.

BRIEF DESCRIPTION OF DRAWINGS

FIG. 9 is a diagram for explaining the correction of the sensor output of the vibration-type angular velocity sensor according to the second embodiment.

DESCRIPTION OF EMBODIMENTS

Hereinafter, embodiments of the present invention will be described with reference to the drawings.

First Embodiment

First, with reference to FIG. 1, a configuration of a vibration-type angular velocity sensor 100 according to a first embodiment will be described. In the first embodiment, an example of performing correction by processing the sensor output of the vibration-type angular velocity sensor 100 in an analog manner will be described.

Figure 1:
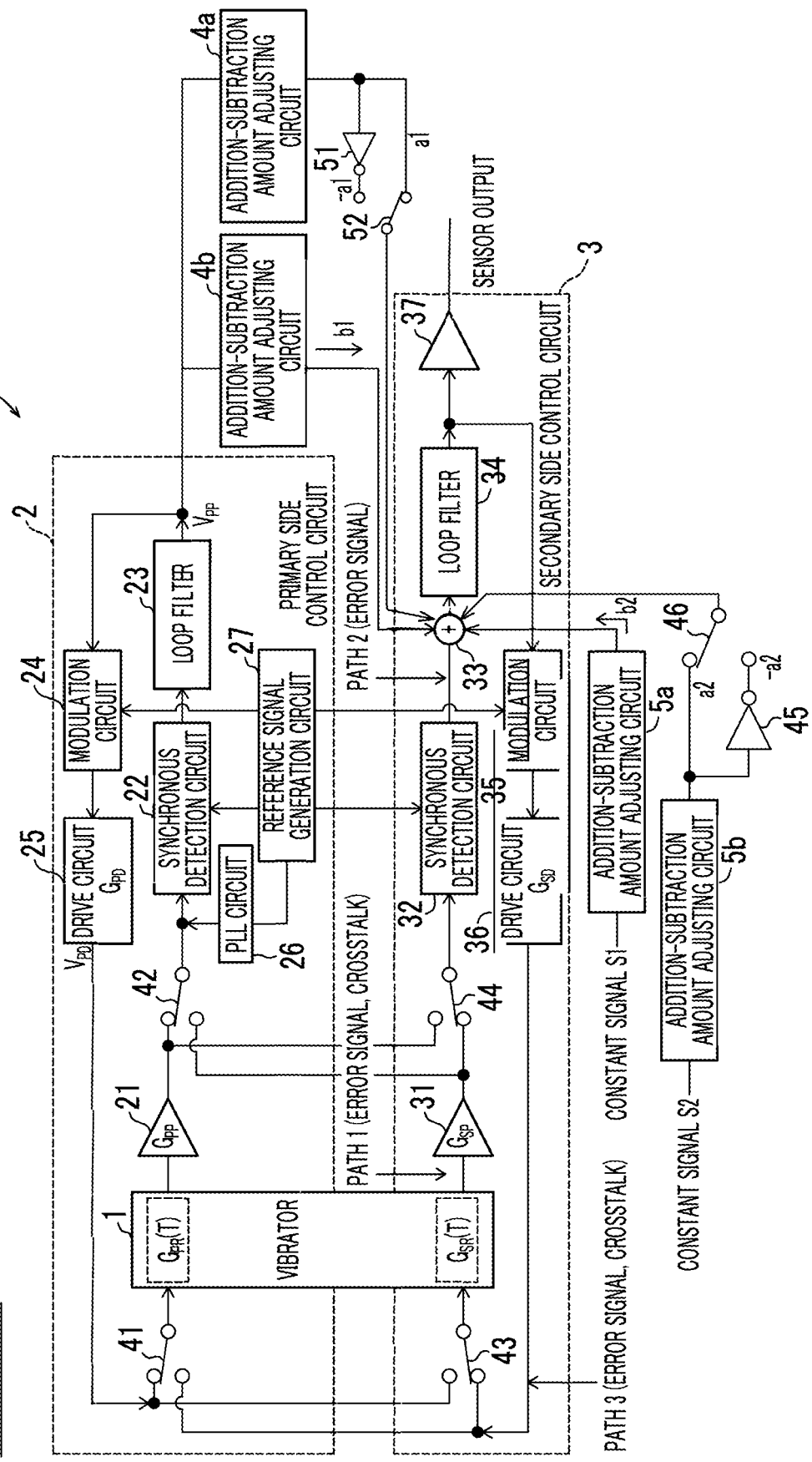
FIG. 1 is a block diagram showing a configuration of a vibration-type angular velocity sensor according to a first embodiment.

As shown in FIG. 1, the vibration-type angular velocity sensor 100 includes a vibrator 1, a primary side control circuit 2 that has a closed control loop for driving the vibrator 1, and a secondary side control circuit 3 that has a closed control loop for detecting and outputting the vibration of the vibrator 1 driven by the primary side control circuit 2. Here, in the first embodiment, the vibrator 1 consists of a ring-type vibrator 1.

The primary side control circuit 2 includes an amplifier circuit 21, a synchronous detection circuit 22, a loop filter 23, a modulation circuit 24, a drive circuit 25, a Phase Locked Loop (PLL) circuit (phase synchronous circuit) 26, and a reference signal generation circuit 27. Then, the vibrator 1, the amplifier circuit 21, the synchronous detection circuit 22, the loop filter 23, the modulation circuit 24, and the drive circuit 25 are connected in this order to constitute the closed control loop. Note that, the loop filter 23 consists of, for example, an integral filter. Further, the loop filter 23 is an example of a "primary side loop filter" in the claims.

The secondary side control circuit 3 includes an amplifier circuit 31, a synchronous detection circuit 32, an adder circuit 33, a loop filter 34, a modulation circuit 35, a drive circuit 36, and an amplifier circuit 37. Then, the vibrator 1, the amplifier circuit 31, the synchronous detection circuit 32, the adder circuit 33, the loop filter 34, the modulation circuit 35, and the drive circuit 36 are connected in this order to constitute a closed control loop. Note that, the adder circuit 33 is composed of a general addition-subtraction circuit using an operational amplifier. Further, the loop filter 34 consists of, for example, an integral filter. Further, the output of the loop filter 34 is input to the amplifier circuit 37. Then, a signal output from the amplifier circuit 37 is output to the outside as the sensor output of the vibration-type angular velocity sensor 100. Note that, the loop filter 34 is an example of a "secondary side loop filter" in the claims.

Here, in the first embodiment, the primary side control circuit 2 and the secondary side control circuit 3 are configured so that a function as the primary side control circuit 2 and a function as the secondary side control circuit 3 are interchangeable. Specifically, in the primary side control circuit 2, a switch 41 is provided on the input side of a signal to the vibrator 1 and a switch 42 is provided on the output side of the signal to the vibrator 1 (the output side of the amplifier circuit 21). Further, in the secondary side control circuit 3, a switch 43 is provided on the input side of the signal to the vibrator 1 and a switch 44 is provided on the output side of the signal to the vibrator 1 (the output side of the amplifier circuit 31). The switch 41, the switch 42, the switch 43, and the switch 44 are configured to be able to switch between a state of being connected to the primary side control circuit 2 and a state of being connected to the secondary side control circuit 3, respectively. In FIG. 1, the switch 41 and the switch 42 show the state of being connected to the primary side control circuit 2, and the switch 43 and the switch 44 show the state of being connected to the secondary side control circuit 3. Further, the switch 41 and the switch 42 are switched so as to be connected to the secondary side control circuit 3, and the switch 43 and the switch 44 are switched so as to be connected to the primary side control circuit 2, so that the function as the primary side control circuit 2 and the function as the secondary side control circuit 3 are interchangeable. That is, the vibration-type angular velocity sensor 100 is configured so that a function of inducing primary vibration and a function of detecting secondary vibration are interchangeable.

Further, the vibration-type angular velocity sensor 100 is provided with addition-subtraction amount adjusting circuits 4a and 4b to which an output from the primary side control circuit 2 (an output from the loop filter 23) is input. The addition-subtraction amount adjusting circuits 4a and 4b are configured to adjust the magnitude of the output of the loop filter 23 of the primary side control circuit 2 dependent on temperature so that the adjusted output (first temporary offset value) is input to the adder circuit 33 of the secondary side control circuit 3. For example, in the addition-subtraction amount adjusting circuits 4a and 4b, the addition amount of the first temporary offset value is adjusted by dividing a voltage using a potentiometer (volume resistance) or the like.

Further, the vibration-type angular velocity sensor 100 is provided with an addition-subtraction amount adjusting circuit 5a to which a constant signal S1 independent of temperature is input. The addition-subtraction amount adjusting circuit 5a is configured to adjust the magnitude of the constant signal S1 so that the adjusted constant signal S1 (second temporary offset value) is input to the adder circuit 33 of the secondary side control circuit 3. For example, in the addition-subtraction amount adjusting circuit 5a, the addition amount of constant signal S1 is adjusted by dividing a voltage using a potentiometer (volume resistance) or the like.

Further, the vibration-type angular velocity sensor 100 is provided with an addition-subtraction amount adjusting circuit 5b to which a constant signal S2 independent of temperature is input. The addition-subtraction amount adjusting circuit 5b is configured to adjust the magnitude of the constant signal S2 so that the adjusted constant signal S2 (second temporary offset value) is input to the adder circuit 33 of the secondary side control circuit 3. For example, in the addition-subtraction amount adjusting circuit 5b, the addition amount of the constant signal S2 is adjusted by dividing a voltage using a potentiometer (volume resistance) or the like.

Here, in the first embodiment, when the sensor output is corrected in the analog manner, a first offset value based on the output of the primary side control circuit 2 (the output of the loop filter 23) inversely proportional to the temperature change of the gain of the vibrator 1 in order to correct the sensor output inversely proportional to the square of the temperature change of the gain of the vibrator 1 from the secondary side control circuit 3 is added to a second offset value based on the constant signal independent of temperature in order to correct the sensor output inversely proportional to the temperature change of the gain of the vibrator 1 from the secondary side control circuit 3, in the closed control loop of the secondary side control circuit 3 (input of the loop filter 34 of the secondary side control circuit 3), and the addition amount of the first offset value and the addition amount of the second offset value are adjusted by the addition-subtraction amount adjusting circuits 4a and 4b and the addition-subtraction amount adjusting circuits 5a and 5b, respectively, so that the sensor output (output from the secondary side control circuit 3) is corrected. Then, the first offset value and the second offset value are determined and added so as to reduce the error of the sensor output, which is generated in the closed control loop of the secondary side control circuit 3 due to an error signal generated from a circuit block constituting the secondary side control circuit 3 and the error of the sensor output, which is generated in the closed control loop of the secondary side control circuit 3 due to crosstalk (signal crossing) from the primary side control circuit 2 to the secondary side control circuit 3, so that the sensor output is corrected.

Then, in the first embodiment, an offset value after interchange (the first offset value and the second offset value) and the offset value before interchange are symmetric values with respect to a predetermined reference value. In other words, a configuration is made so that the absolute value of the difference between the offset value added to the closed control loop before interchange and the predetermined reference value is approximately equal to the absolute value of the difference between the offset value added to the closed control loop after interchange and the predetermined reference value.

Specifically, in the first embodiment, when a temporary offset value before interchange is set to a, a temporary offset value after interchange is set to −a, and a temporary offset value with respect to a median value of the sensor output before interchange and the sensor output after interchange is set to b, the offset value before interchange is a+b and the offset value after interchange is −a+b. Note that, the temporary offset value a indicates a first temporary offset value a1 which will be described later and a second temporary offset value a2 which will be described later. Further, the temporary offset value b indicates a first temporary offset value b1 described later and a second temporary offset value b2 which will be described later. Note that, the temporary offset value b with respect to the median value is an example of a "predetermined reference value" in the claims.

Specifically, as shown in FIG. 1, the addition-subtraction amount adjusting circuit 4a and the addition-subtraction amount adjusting circuit 4b are provided on the output side of the primary side control circuit 2. An inverting circuit 51 and a switch 52 are provided on the output side of the addition-subtraction amount adjusting circuit 4a. The switch 52 is configured to be able to switch between a state of being connected to the addition-subtraction amount adjusting circuit 4a and a state of being connected to the inverting circuit 51. Then, as shown in FIG. 1, in the state in which the switch 52 is connected to the addition-subtraction amount adjusting circuit 4a, the output (a1) from the addition-subtraction amount adjusting circuit 4a and the output (b1) from the addition-subtraction amount adjusting circuit 4b are input to the adder circuit 33. That is, a1+b1 is added as the first offset value to the secondary side control circuit 3. Further, in a state in which the switch 52 is connected to the inverting circuit 51, the output (−a1) from the inverting circuit 51 and the output (b1) from the addition-subtraction amount adjusting circuit 4b are input to the adder circuit 33. That is, −a1+b1 is added as the first offset value to the secondary side control circuit 3. Note that, a method for obtaining a1 and b1 will be described later.

Further, a NOT circuit 45 and a switch 46 are provided on the output side of the addition-subtraction amount adjusting circuit 5b. The switch 46 is configured to be able to switch between a state of being connected to the addition-subtraction amount adjusting circuit 5b and a state of being connected to the NOT circuit 45. Then, as shown in FIG. 1, in the state in which the switch 46 is connected to the addition-subtraction amount adjusting circuit 5b, the output (a2) from the addition-subtraction amount adjusting circuit 5b and the output (b2) from the addition-subtraction amount adjusting circuit 5a are input to the adder circuit 33. That is, a2+b2 is added as the second offset value to the secondary side control circuit 3. Further, in the state in which the switch 46 is connected to the NOT circuit 45, the output (−a2) from the NOT circuit 45 and the output (b2) from the addition-subtraction amount adjusting circuit 5a are input to the adder circuit 33. That is, −a2+b2 is added as the second offset value to the secondary side control circuit 3. Note that, a method for obtaining a2 and b2 will be described later.

(Configuration without Interchange of Function)

Next, with reference to FIG. 1, the correction of the sensor output of the vibration-type angular velocity sensor 100 will be described in detail. Hereinafter, a case where the function as the primary side control circuit 2 and the function as the secondary side control circuit 3 are not interchanged (that is, the configuration of Japanese Patent No. 6463335) will be described.

First, an error of the output of the vibration-type angular velocity sensor 100 to be corrected will be described. As the error of the output of the vibration-type angular velocity sensor 100, the error of the sensor output of the vibration-type angular velocity sensor 100, which is generated due to the error signal generated from the circuit block constituting the secondary side control circuit 3, and the error of the sensor output of the vibration-type angular velocity sensor 100, which is generated due to the influence (crosstalk) from the primary side control circuit 2, exist. It is assumed that the component (error component) of the error signal, which is generated from the circuit block constituting the secondary side control circuit 3, is a constant value having no temperature dependence. Note that, in general, in a feedback circuit, an output signal from each circuit is expressed using a value obtained by dividing an input signal input to each circuit by a feedback gain (output signal=input signal×1/(feedback gain)).

As described in Japanese Patent No. 6463335, the total $V_{Out\_Total\_Error}$ of the error of the sensor output, which is generated in the closed control loop of the secondary side control circuit 3 due to the error signal generated from the circuit block constituting the secondary side control circuit 3, and the error of the sensor output, which is generated in the closed control loop of the secondary side control circuit 3 due to the crosstalk from the primary side control circuit 2 to the secondary side control circuit 3 is expressed by the following Equation 5. Note that, A, B, and C are constant values (coefficients) independent of temperature.

$$V_{Out\_Total\_Error} = A \cdot \frac{1}{G_R^2(T)} + B \cdot \frac{1}{G_R(T)} + C \quad \text{[Equation 5]}$$

Next, a case where the sensor output is corrected in the analog manner with respect to the error $V_{Out\_Total\_Error}$ of the sensor output of the vibration-type angular velocity sensor 100 expressed by the Equation 5 will be specifically described.

First, $V_{in\_Const\_Corr}$ (second offset value) based on the constant signal independent of temperature is added to the input (path 2) of the loop filter 34 of the secondary side control circuit 3. In this case, the sensor output $V_{Out\_Const\_Corr}$ of the vibration-type angular velocity sensor 100 is expressed by the following Equation 6.

$$V_{Out\_Const\_Corr} = p \cdot \frac{1}{G_R(T)} \quad \text{[Equation 6]}$$

Here, when the second offset value based on the constant signal independent of temperature is added to the input of the loop filter 34, the sensor output $V_{Out\_Const\_Corr}$ becomes a value inversely proportional to the gain $G_R(T)$ dependent on temperature, as shown in the above Equation 6. Note that, p in the Equation 6 is a constant value. Then, by adjusting $V_{in\_Const\_Corr}$ (second offset value) by the addition-subtraction amount adjusting circuit 5a so that the magnitude of p in the Equation 6 and the magnitude of B of B/$G_R(T)$ which is the second term in the Equation 5 are equal (p=−B), B/$G_R(T)$, which is the second term of the Equation 5, is cancelled. That is, by adjusting the second offset value based on the constant signal independent of temperature and adding the second offset value to the input of the loop filter 34, it is possible to cancel the term inversely proportional to the square of the gain $G_R(T)$ dependent on temperature in the above Equation 5.

Further, the output $V_{AGC}$ of the loop filter 23 of the primary side control circuit 2 dependent on temperature is expressed by the following Equation 7. Note that, the output $V_{AGC}$ of the loop filter 23 is the output of the loop filter 23 in consideration of the closed control loop, and is a value dependent on temperature.

$$V_{AGC} = D \cdot \frac{1}{G_R(T)} \quad \text{[Equation 7]}$$

Here, in the analog correction according to the first embodiment, in addition to $V_{in\_Const\_Corr}$ (second offset value) based on the constant signal independent of temperature, a value (first offset value) obtained by multiplying the output $V_{AGC}$ by a certain ratio q is added to the input (path 2) of the loop filter 34 of the secondary side control circuit 3. The sensor output $V_{out\_AGC\_Corr}$ of the vibration-type angular velocity sensor 100 when the first offset value is added is expressed by the following Equation 8.

$$V_{Out\_Const\_Corr} = r \cdot \frac{1}{G_R^2(T)} \quad \text{[Equation 8]}$$

Here, when the first offset value based on the output of the primary side control circuit 2 dependent on temperature is added to the input of the loop filter 34, the sensor output $V_{Out\_AGC\_Corr}$ is a value inversely proportional to the square of gain $G_R(T)$ dependent on temperature as shown in the Equation 8. Note that, r in the Equation 8 is a constant value. Then, by adjusting q by the addition-subtraction amount adjusting circuit 4b so that the magnitude of r in the Equation 8 and the magnitude of A of A/$G_R^2(T)$ of the first term, which includes the square of $G_R(T)$ in the Equation 5 are equal (r=−A), A/$G_R^2(T)$, which is the first term of the Equation 5, is cancelled. That is, while the sensor output of the vibration-type angular velocity sensor 100 becomes a value obtained by adding the error expressed by the Equation 5 to the original sensor output when the sensor output is not corrected, the first offset value and the second offset value are added in the first embodiment, so that the sensor output of the vibration-type angular velocity sensor 100 becomes a value obtained by adding a constant value C to the original sensor output.

Note that, since C in Equation 5 is a constant value independent of temperature, there is no problem in correction. Further, coefficients A, B, and C in the Equation 5 are calculated by measuring (actually measuring) the sensor output of the vibration-type angular velocity sensor 100 before correction (before compensation) at each temperature and by performing polynomial approximation on the measured data by the least squares method. Note that, the coefficients A, B, and C are calculated for each vibration-type angular velocity sensor 100 (for each product).

In this way, the sensor output is corrected in the analog manner by adjusting the addition amount of the first offset value based on the output of the primary side control circuit 2 dependent on temperature so that A/$G_R^2(T)$ (a term inversely proportional to the square of the gain $G_R(T)$ dependent on temperature), which is the first term of Equation 5, is set to 0 and by adjusting the addition amount of the second offset value based on the constant signal independent of temperature so that B/$G_R(T)$ (a term inversely proportional to the gain $G_R(T)$ dependent on temperature), which is the second term of the Equation 5, is set to 0.

Figure 2:
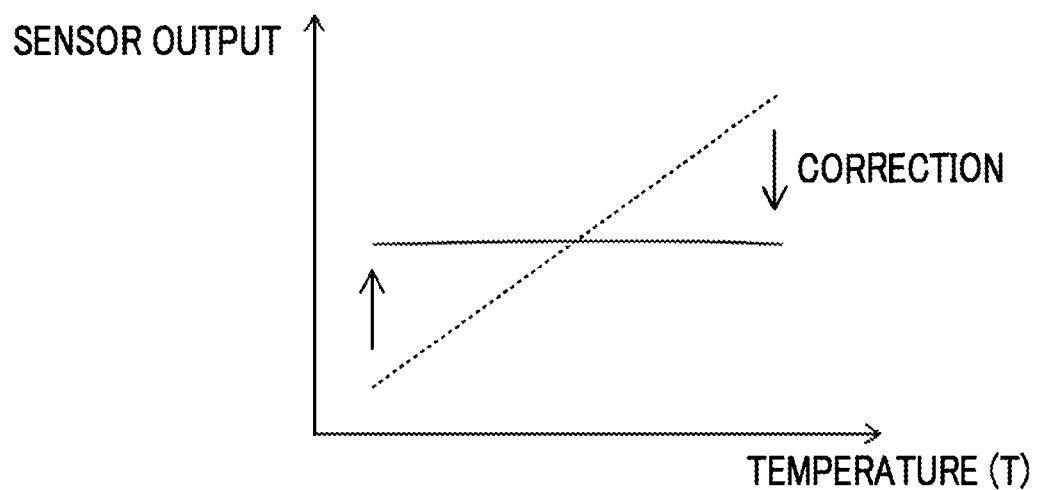
FIG. 2 is a diagram for explaining the correction of the sensor output of the vibration-type angular velocity sensor (the correction of a component proportional to $1/G_R(T)$ (first power of temperature)) according to the first embodiment.
Figure 3:
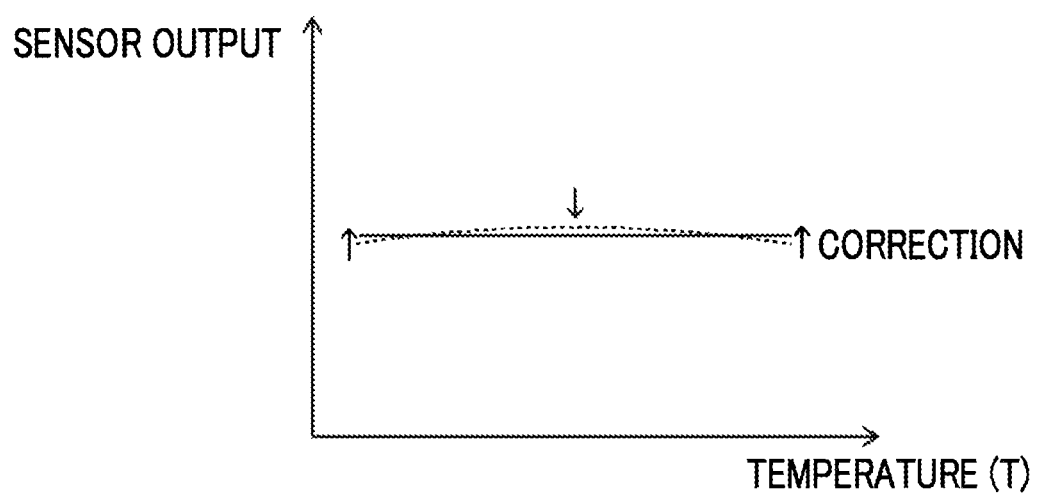
FIG. 3 is a diagram for explaining the correction of the sensor output of the vibration-type angular velocity sensor (correction of a component proportional to $1/G_R^2(T)$ (square of temperature)) according to the first embodiment.

That is, as shown in FIG. 2, the component (the second term in Equation 5) proportional to 1/$G_R(T)$ of the error of the sensor output of the vibration-type angular velocity sensor 100 (a term inversely proportional to the gain $G_R(T)$ dependent on temperature) is cancelled by adding the second offset value based on the constant signal independent of temperature, so that the sensor output (dotted line in FIG. 2) having a characteristic dependent on temperature becomes approximately constant (solid line in FIG. 2). However, as shown in FIG. 3, even the sensor output, which is made approximately constant, microscopically has a characteristic dependent on temperature (dotted line in FIG. 3). Therefore, the component (the first term in Equation 5) proportional to 1/$G_R^2(T)$ of the sensor output of the vibration-type angular velocity sensor 100 (a term inversely proportional to the square of the gain $G_R(T)$ dependent on temperature) is cancelled by adding the first offset value based on the output of the primary side control circuit 2 dependent on temperature, so that the sensor output (solid line in FIG. 3) is independent on temperature and becomes approximately constant. As a result, it is possible to improve the accuracy of correction. Further, when the sensor output of the vibration-type angular velocity sensor 100 is corrected in the analog manner, the signal is a continuous value unlike a case where the sensor output of the vibration-type angular velocity sensor 100 is corrected in a digital manner (the signal is a discrete value), so that it is possible to suppress the change in steps (make the sensor output the continuous value).

(Configuration with Interchange of Function)

Next, the offset value of the first embodiment, which is configured so that the function as the primary side control circuit 2 and the function as the secondary side control circuit 3 are interchangeable, will be described.

Figure 4:
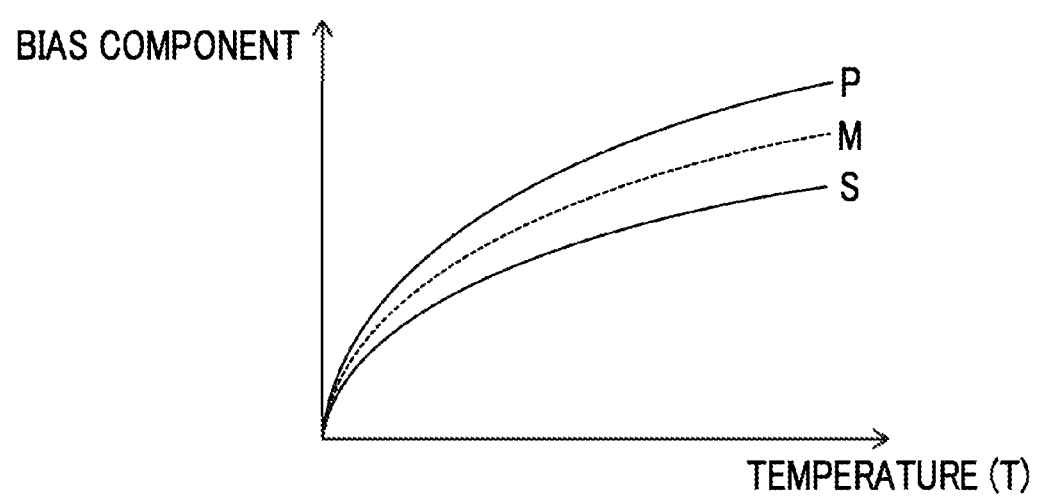
FIG. 4 is a diagram showing the relationship between temperature and a bias component.
Figure 5:
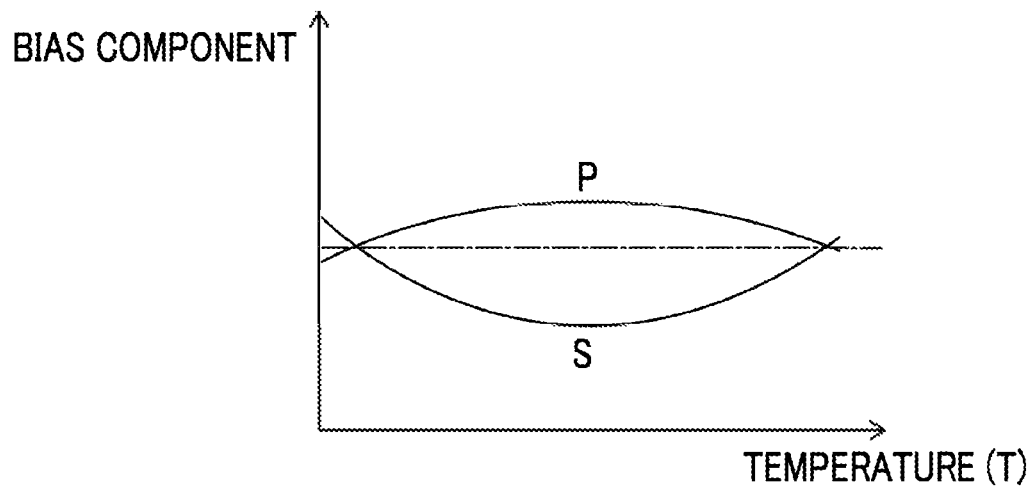
FIG. 5 is a diagram (1) showing the relationship between temperature after correction of the sensor output by an offset value and the bias component.

As shown in FIG. 4, in general, in the vibration-type angular velocity sensor 100, the bias component (vertical axis) of the angular velocity detected by the vibration-type angular velocity sensor 100 changes with respect to the temperature change (horizontal axis). Further, the change in the bias component before the function as the primary side control circuit 2 and the function as the secondary side control circuit 3 are interchanged (P in FIG. 4) is different from the change in the bias component after interchange (S in FIG. 4). Then, as shown in FIG. 5, before interchange, the temperature change (P in FIG. 5) in the sensor output becomes small by adding the first offset value and the second offset value so as to cancel the first term and the second term of the Equation 5. Further, after interchange, the temperature change of the sensor output (S in FIG. 5) becomes small by adding the first offset value and the second offset value so as to cancel the first term and the second term of the Equation 5. Note that, since S of P in FIG. 5 is not symmetrical with respect to the line segment (the alternate long and short dash line in FIG. 5) along the horizontal axis, the temperature fluctuation component of the difference between P and S in FIG. 5 does not become zero. In this way, when the first offset value and the second offset value are individually determined so as to cancel the first term and the second term of the Equation 5 before and after interchange, the temperature fluctuation component of the difference between P and S of FIG. 5 does not become zero.

Figure 6:
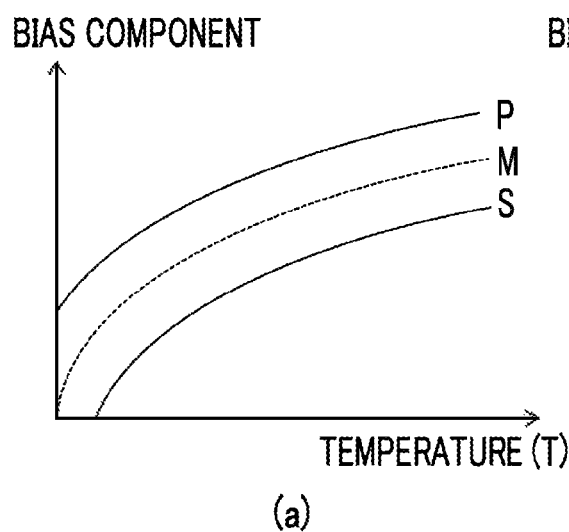
FIG. 6(a) is a diagram (2) showing the relationship between temperature after correction of the sensor output by the offset value and the bias component.
FIG. 6(b) is a diagram (3) showing the relationship between temperature after correction of the sensor output by the offset value and the bias component.
Figure 6:
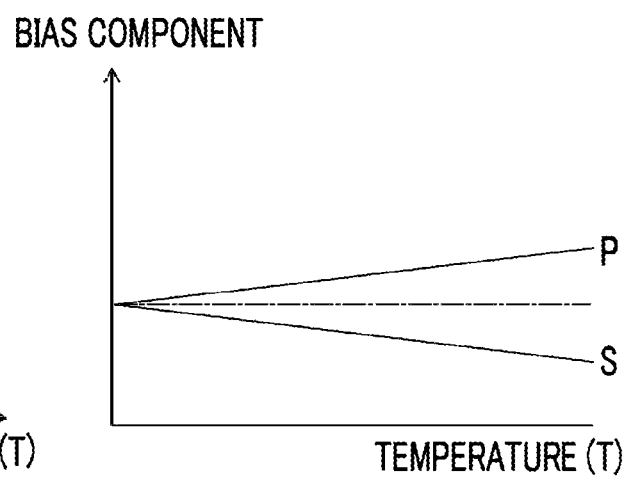

Therefore, as shown in FIG. 6(a), the first temporary offset value a1 and the second temporary offset value a2 before and after interchange are determined so that the temperature fluctuation component of the difference becomes the smallest before and after interchange and the polarity of the offset value is reversed before and after interchange. Note that, since when the first temporary offset value a1 and the second temporary offset value a2 are used before interchange, the first term and the second term of the Equation 5 are not cancelled, so that the bias component has a gradient with respect to temperature in a state before interchange. Similarly, when the first temporary offset value −a1 and the second temporary offset value −a2 are used after interchange, the first term and the second term of the Equation 5 are not cancelled, so that the bias component has a gradient with respect to temperature in a state after interchange.

Figure 7:
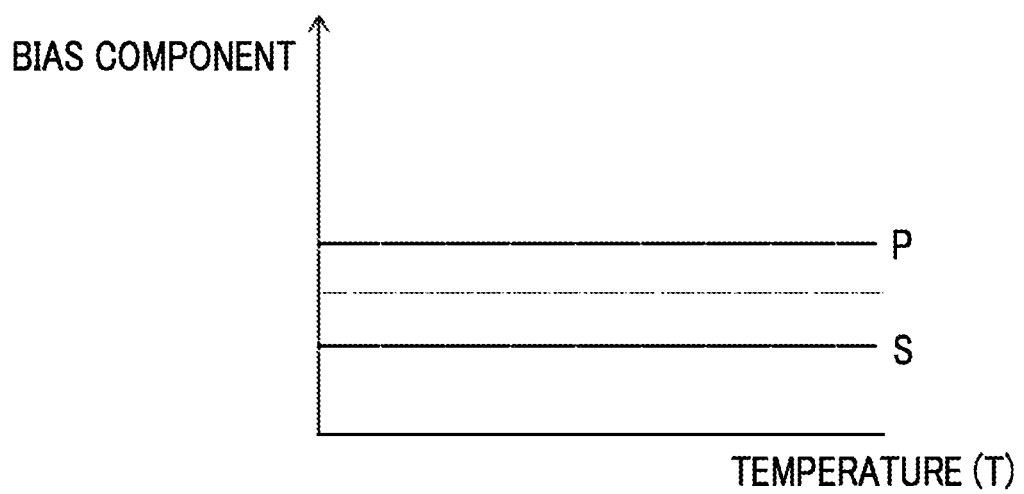
FIG. 7 is a diagram (3) showing the relationship between the temperature after correction of the sensor output by the offset value and the bias component.

Therefore, as shown in FIG. 6(b), the first temporary offset value b1 and the second temporary offset value b2 are determined so as to cancel the first term and the second term of the Equation 5 with respect to the median value (M in FIG. 4) between the change in the bias component (P in FIG. 4) before interchange of the function as the primary side control circuit 2 and the function as the secondary side control circuit 3 and the change in the bias component (S in FIG. 4) after interchange. Then, the first offset value is set to a1+b1 and the second offset value is set to a2+b2 before interchange, and the first offset value is set to −a1+b1 and the second offset value is −a2+b2 after interchange. As a result, before and after interchange, the first offset value becomes symmetrical with respect to the first temporary offset value b1 with respect to the median value, and the second offset value becomes symmetrical with respect to the second temporary offset value b2 with respect to the median value. As a result, as shown in FIG. 7, both the temperature gradients of the change in the bias component before interchange (P in FIG. 7) and the change in the bias component after interchange (S in FIG. 7) are reduced. As a result, it is possible to reduce the temperature gradient of the bias component while reducing the difference between P and S in FIG. 7 (residual bias component).

Effects of First Embodiment

In the first embodiment, the following effects can be obtained. Note that, in the following, a Q value (dimensionless number indicating the state of vibration) is described as having a characteristic that is approximately inversely proportional to temperature.

In the first embodiment, as described above, the primary side control circuit 2 and the secondary side control circuit 3 are configured so that the function as the primary side control circuit 2 and the function as the secondary side control circuit 3 are interchangeable, and the offset value after interchange and the offset value before interchange are symmetric values with respect to the predetermined reference value. As a result, the offset values become symmetrical with respect to the predetermined reference value before and after the function as the primary side control circuit 2 and the function as the secondary side control circuit 3 are interchanged, so that it is possible to suppress the control symmetry of the vibration-type angular velocity sensor 100 before and after interchange from being broken. As a result, it is possible to suppress an increase in the temperature fluctuation component of a bias that remains without being cancelled.

Further, in the first embodiment, as described above, the primary side control circuit 2 and the secondary side control circuit 3 respectively include the loop filter 23 and the loop filter 34 in the closed control loop, and are configured to correct the sensor output by adding the offset values to the input of the loop filter 34. Here, the output in the closed control loop corresponds to the output of the loop filter. Then, the output of the loop filter is inversely proportional to the gain of the vibrator 1 dependent on temperature due to the feedback operation of the closed control loop. The first embodiment focuses on this point, and, by adding the offset value to the input of the loop filter 34, it is possible to reduce the error caused by the crosstalk inversely proportional to the first power and/or the square of the gain of the vibrator 1.

Further, in the first embodiment, as described above, when the offset value before interchange is set to a, the offset value after interchange is −a in which the polarity of the offset value before interchange is reversed. As a result, the offset values become symmetrical with respect to zero before and after the function as the primary side control circuit 2 and the function as the secondary side control circuit 3 are interchange, so that it is possible to suppress the control symmetry of the vibration-type angular velocity sensor 100 before and after interchange from being broken.

Further, in the first embodiment, as described above, when the temporary offset value before interchange is set to a, the temporary offset value after interchange is set to −a, and the temporary offset value with respect to the median value of the sensor output before interchange and the sensor output after interchange is set to b, the offset value before interchange is a+b and the offset value after interchange is −a+b. As a result, the offset values become symmetrical with respect to b before and after the function as the primary side control circuit 2 and the function as the secondary side control circuit 3 are interchanged, so that is possible to suppress the symmetry of the control of the vibration-type angular velocity sensor 100 before and after interchange from being broken. Further, since the offset values before and after interchange are symmetrical with respect to the offset value b with respect to the median value of the sensor outputs before and after interchange, it is possible to suppress the symmetry of the control of the vibration-type angular velocity sensor 100 before and after interchange from being broken while reducing the gradient of the residue of the bias component with respect to environmental temperature.

Further, in the first embodiment, as described above, a configuration is made so that, when the sensor output is corrected in the analog manner, the sensor output is corrected by adding the first offset value based on the output of the primary side control circuit 2 inversely proportional to the temperature change of the gain of the vibrator 1 in order to correct the sensor output inversely proportional to the square of the temperature change of the gain of the vibrator 1 from the secondary side control circuit 3 and the second offset value based on the constant signal independent of temperature in order to correct the sensor output inversely proportional to the temperature change of the gain of the vibrator 1 from the secondary side control circuit 3 in the closed control loop of the secondary side control circuit 3, and adjusting the addition amount of the first offset value and the addition amount of the second offset value. Here, when the second offset value based on the constant signal independent of temperature is added in the closed control loop of the secondary side control circuit 3, the output of the secondary side control circuit 3 has a characteristic inversely proportional to the gain of the vibrator 1 dependent on temperature. Further, similarly, the output of the primary side control circuit 2 also has a characteristic inversely proportional to the gain of the vibrator 1 due to the feedback operation of the closed control loop. Therefore, by adding the first offset value based on the output of the primary side control circuit 2 having the characteristic inversely proportional to the gain of the vibrator 1 in the closed control loop of the secondary side control circuit 3, the output of the secondary side control circuit 3 has the characteristic inversely proportional to the square of the gain of the vibrator 1. That is, the sensor output is corrected by adding the first offset value corresponding to the square of the gain of the vibrator 1 and the second offset value corresponding to the first power of the gain of the vibrator 1 and adjusting the addition amount of the first offset value and the addition amount of the second offset value, so that it is possible to perform correction inversely proportional to the first power of the gain of the vibrator 1 and correction inversely proportional to the square of the gain of the vibrator 1.

Further, in the first embodiment, as described above, a configuration is made so that, when the gain dependent on temperature of the vibrator 1 is $G_R(T)$ and A, B, and C are constant values independent of temperature, the total $V_{Out\_Total\_Error}$ of the error of the sensor output generated in the closed control loop of the secondary side control circuit 3 due to the error signal generated from the circuit block constituting the secondary side control circuit 3 and the error of the sensor output generated in the closed control loop of the secondary side control circuit 3 due to the crosstalk from the primary side control circuit 2 to the secondary side control circuit 3 is expressed in the Equation 5, and the sensor output is corrected in the analog manner by adjusting the addition amount of the first offset value based on the output of the primary side control circuit 2 dependent on temperature inversely proportional to the temperature change of the gain of the vibrator 1 so as to reduce $A/G_R^2(T)$ which is the first term of the Equation 5 and adjusting the addition amount of the second offset value based on the constant signal independent of the temperature so as to reduce $B/G_R(T)$ which is the second term of the Equation 5. Therefore, it is possible to reduce both the primary (first power of the gain of the vibrator 1) component and the secondary (square of the gain of the vibrator 1) component of the error of the sensor output, so that it is possible to surely increase the accuracy of correction. Note that, although the constant value C remains, C is the constant value independent of temperature. Therefore, the error of the sensor output due to the temperature change is not influenced, so that there is no problem in correction.

Further, in the first embodiment, as described above, the vibrator 1 includes the ring-type vibrator 1. Here, since the ring-type vibrator 1 has a symmetrical shape, a vibration mode by the primary side control circuit 2 and a vibration mode by the secondary side control circuit 3 are similar. Therefore, when the present invention is applied to the vibration-type angular velocity sensor 100 including the ring-type vibrator 1, it is not necessary to consider the influence of the difference in the vibration modes, so that it is possible to easily correct the sensor output.

Further, in the first embodiment, as described above, the vibration-type angular velocity sensor 100 is configured so that the function of inducing the primary vibration and the function of detecting the secondary vibration are interchangeable, and the offset value after interchange and the offset value before interchange are symmetric values with respect to the predetermined reference value. As a result, the offset values are symmetrical with respect to the predetermined reference value before and after the function of inducing the primary vibration and the function of detecting the secondary vibration are interchanged, so that it is possible to suppress the symmetry of the control of the vibration-type angular velocity sensor 100 before and after interchange from being broken. As a result, it is possible to suppress an increase in the temperature fluctuation component of a bias that remains without being cancelled.

Second Embodiment

Next, with reference to FIG. 8, a configuration of a vibration-type angular velocity sensor 101 according to a second embodiment will be described. In the second embodiment, an example of performing correction by processing the output of a loop filter 23 of the primary side control circuit 2 in a digital manner will be described.

Figure 8:
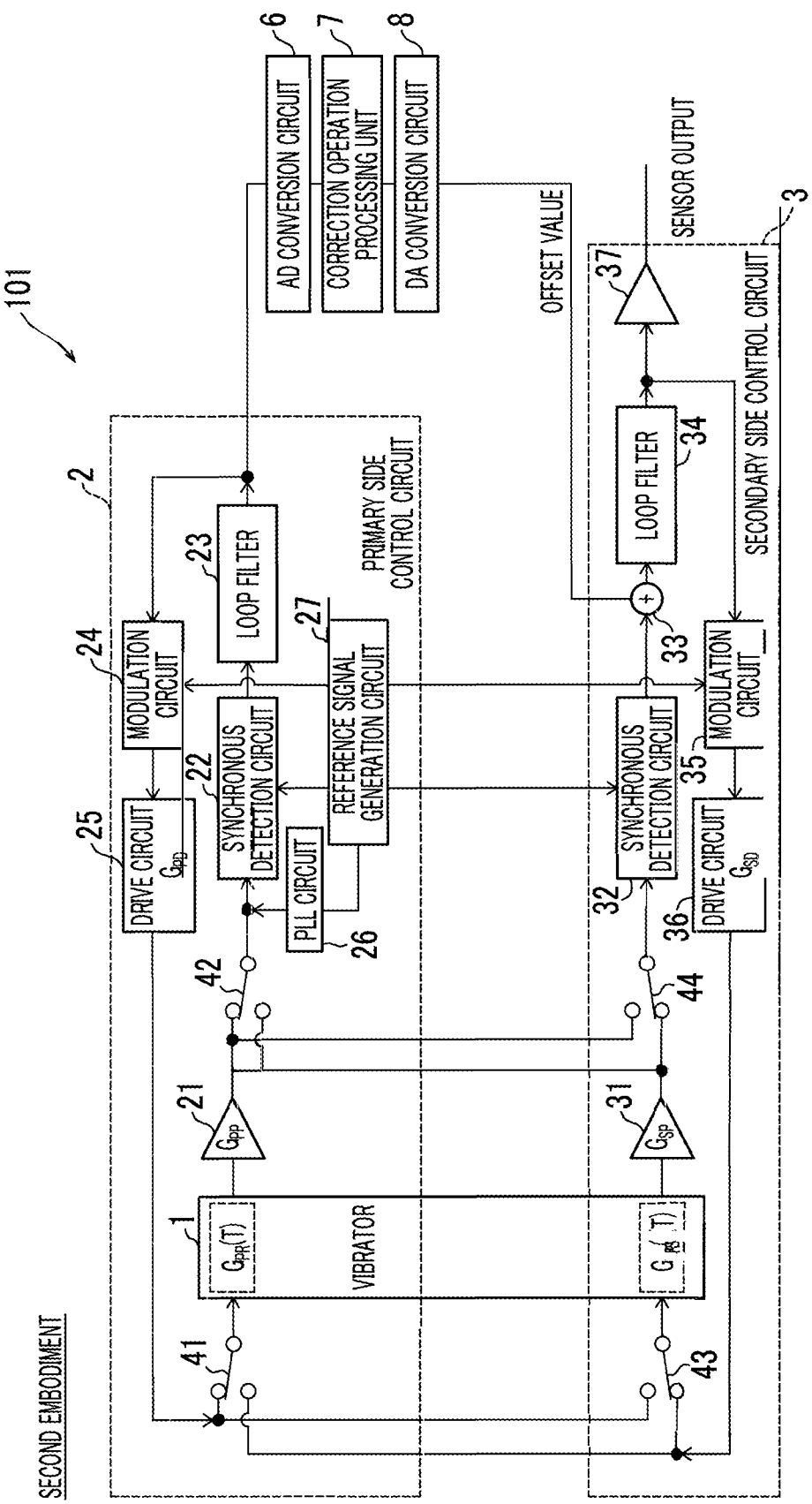
FIG. 8 is a block diagram showing a configuration of a vibration-type angular velocity sensor according to a second embodiment.

As shown in FIG. 8, the vibration-type angular velocity sensor 101 includes a vibrator 1, the primary side control circuit 2, a secondary side control circuit 3, an AD conversion circuit 6, a correction operation processing unit 7, and a DA conversion circuit 8. Note that, the configurations of the vibrator 1, the primary side control circuit 2, and the secondary side control circuit 3 are the same as in the first embodiment.

Further, as in the first embodiment, the primary side control circuit 2 and the secondary side control circuit 3 are configured so that the function as the primary side control circuit 2 and the function as the secondary side control circuit 3 are interchangeable. Specifically, in the primary side control circuit 2, the switch 41 is provided on the input side of the signal to the vibrator 1 and the switch 42 is provided on the output side of the signal to the vibrator 1 (the output side of the amplifier circuit 21). Further, in the secondary side control circuit 3, the switch 43 is provided on the input side of the signal to the vibrator 1 and the switch 44 is provided on the output side of the signal to the vibrator 1 (the output side of the amplifier circuit 31).

Further, a configuration is made so that an analog signal dependent on temperature output from the loop filter 23 of the primary side control circuit 2 is input to the AD conversion circuit 6, and the AD conversion circuit 6 converts (quantizes) the analog signal into a digital signal and outputs the digital signal to the correction operation processing unit 7. Then, in the second embodiment, a configuration is made so that the correction operation processing unit 7 outputs an offset value for reducing an error of a sensor output due to a temperature change with respect to the quantized output of the primary side control circuit 2 (output from the AD conversion circuit 6) to the DA conversion circuit 8. Further, a configuration is made so that the DA conversion circuit 8 converts the offset value into the analog signal and adds the analog signal to the input of the loop filter 34 of the secondary side control circuit 3. As a result, a configuration is made so that the vibration-type angular velocity sensor 101 corrects the sensor output.

Next, a case where the sensor output is corrected in a digital manner will be specifically described with reference to FIGS. 8 and 9.

First, by measuring the sensor output of the vibration-type angular velocity sensor 101 while sweeping (changing to various values) the offset value (correction value) input to the adder circuit 33 of the secondary side control circuit 3, an offset value (y1, y2 . . . , see FIG. 9) at each temperature (T1, T2 . . . , see FIG. 9) is searched for before and after interchange so that the residue of a temperature fluctuation component of a bias (difference before and after interchange) is minimized before and after interchange and the polarity of the offset value is reversed before and after interchange, similarly to the first embodiment. Further, an offset value (z1, z2 . . . , See FIG. 9) at each temperature (T1, T2 . . . , See FIG. 9) is searched for, in which the error of the sensor output of the vibration-type angular velocity sensor 101 (error corresponding to the error defined by the Equation 5) is 0 or approximately 0 with respect to the median value of bias components before and after interchange.

Next, the following Equation 9 (l, m, and n are coefficients of constant values) is obtained (calculated) by setting a quantized output from the primary side control circuit 2 (loop filter 23) at each temperature to x, setting the offset value, at which the residue of the temperature fluctuation component of the bias (difference before and after interchange) is the minimized, to y, and performing polynomial approximation on data shown in FIG. 9 by the least squares method. In the second embodiment, a second-degree polynomial is used as being expressed in the following Equation 9.

$$y = lx^2 + mx + n \quad \text{[Equation 9]}$$

Similarly, the following Equation 10 is obtained by setting the quantized output from the primary side control circuit 2 (loop filter 23) at each temperature to x and using the offset value with respect to the median value of the bias components before and after interchange.

$$z = lx^2 + mx + n \quad \text{[Equation 10]}$$

As a result, the relational expression (the Equation 9 and the Equation 10) between the offset value at each temperature and the quantized output of the primary side control circuit 2 at each temperature is obtained in advance (before the actual use of the vibration-type angular velocity sensor 101). Note that, the relational expression is calculated for each vibration-type angular velocity sensor 101 (for each product). Then, when the vibration-type angular velocity sensor 101 is actually used, in the vibration-type angular velocity sensor 101, the correction is performed by adding an offset value (y+z before interchange and −y+z after interchange), which is obtained by being operated by software in the correction operation processing unit 7 using the Equation 9 and the Equation 10 with respect to the quantized output (x) of the primary side control circuit 2, to the secondary side control circuit 3. That is, when the sensor output is corrected in a digital manner, an operation is always performed using the relational expressions (the Equation 9 and the Equation 10), and the correction is always performed to correspond to the quantized output of the primary side control circuit 2.

In the second embodiment, the following effects can be obtained.

In the second embodiment, as described above, a configuration is made so that, when the sensor output is corrected in a digital manner, the sensor output is corrected by quantizing the output of the primary side control circuit 2 dependent on temperature inversely proportional to the temperature change of the gain of the vibrator 1 and adding the offset value, which reduces the error of the sensor output due to the temperature change with respect to the quantized output of the primary side control circuit 2, to the secondary side control circuit 3. As a result, it is possible to correct the sensor output by only adding the offset value for reducing the error of the sensor output due to the temperature change to the secondary side control circuit 3, so that it is possible to simplify the configuration of the vibration-type angular velocity sensor 101 unlike a case of adding an offset value other than the offset value based on the output of the primary side control circuit 2 dependent on temperature.

Note that, it should be noted that the embodiments disclosed this time are exemplary in all aspects and are not restrictive. The scope of the present invention is shown by the claims rather than the description of the embodiment described above, and further includes all modifications within the meaning and scope equivalent to the claims.

For example, in the first and second embodiments, an example in which the ring-type vibrator is used is shown, but the present invention is not limited thereto. For example, the vibrator may have a symmetrical shape, and a vibrator having a disk type, a cup type (wine glass type), an octagonal type, or the like may be used.

Further, in the first and second embodiments, an example in which the closed control loop is configured by the vibrator, the amplifier circuit, the synchronous detection circuit, the loop filter, the modulation circuit, and the drive circuit is shown, but the present invention is not limited thereto. For example, the control loop may be configured by a configuration other than the configuration consisting of the amplifier circuit, the synchronous detection circuit, the loop filter, the modulation circuit, and the drive circuit.

Further, in the first and second embodiments, an example in which an integral filter is used as the loop filter is shown, but, for example, a loop filter other than the integral filter may be used.

Further, in the first embodiment, an example is shown in which the first offset value before interchange is a1+b1 and the second offset value is a2+b2, and the first offset value after interchange is −a1+b1 and the second offset value is −a2+b2. However, the present invention is not limited thereto. For example, the first offset value before interchange may be a1 and the second offset value may be a2, and the first offset value after interchange may be −a1 in which the polarity of the first offset value a1 before interchange is reversed and the second offset value after interchange may be −a2 in which the polarity of the second offset value a2 before interchange is reversed. As a result, before and after the function as the primary side control circuit 2 and the function as the secondary side control circuit 3 are interchanged, some residue of the temperature fluctuation component of the bias remains. However, the first offset value for performing the correction inversely proportional to the square of the gain of the vibrator 1 and the second offset value for performing the correction inversely proportional to the first power of the gain of the vibrator 1 are symmetrical with respect to zero (predetermined reference value), so that it is possible to suppress the symmetry of the control of the vibration-type angular velocity sensor before and after interchange from being broken.

Further, in the first embodiment, an example is shown in which the first offset value before interchange is a1+b1 and the second offset value is a2+b2, and the first offset value after interchange is −a1+b1 and the second offset value is −a2+b2. However, the present invention is not limited thereto. For example, a configuration may be made so that the median value is determined to cancel the first term of the Equation 5 (that is, the first offset value is fixed to b1), the second offset value before interchange is a2+b2, and the second offset value after interchange may be −a2+b2. That is, only the second offset value may be a symmetric value with respect to a predetermined reference value before and after interchange.

Further, in the first and second embodiments, an example is shown in which the first temporary offset value a1 and the second temporary offset value a2 before and after interchange are determined so that the residue of the bias component becomes the smallest before and after interchange. However, the present invention is not limited thereto. For example, the first offset value and the second offset value before and after interchange may be determined so that the residue of the bias component becomes a value in the vicinity of the smallest value before and after interchange.

Further, in the first embodiment, an example is shown in which the addition-subtraction amount adjusting circuits 4a and 4b and the addition-subtraction amount adjusting circuits 5a and 5b (four individual circuits) are provided so as to output the offset value a+b and the offset value −a+b. However, the present invention is not limited thereto. In the present invention, a circuit that outputs a signal corresponding to the offset value a+b and the offset value −a+b may be provided.

REFERENCE SIGNS LIST

1 Vibrator
2 Primary side control circuit
3 Secondary side control circuit
23 Loop filter (Primary side loop filter)
34 Loop filter (Secondary side loop filter)
100, 101 Vibration-type angular velocity sensor

The invention claimed is:
1. A vibration-type angular velocity sensor comprising:
a vibrator;
a primary side control circuit that has a closed control loop, an output of the closed control loop inducing primary vibration in the vibrator; and
a secondary side control circuit that has a closed control loop which detects secondary vibration generated in the vibrator due to an angular velocity applied to the vibrator, and is configured to correct a sensor output by adding an offset value to the closed control loop of the secondary side control circuit, wherein
the primary side control circuit and the secondary side control circuit are configured so that a function as the primary side control circuit and a function as the secondary side control circuit are interchangeable, and
after interchanging the functions of the primary side control circuit and the secondary side control circuit, an offset value added to the closed control loop of the primary side control circuit after interchange and the offset value added to the closed control loop of the secondary side control circuit before interchange are symmetric values with respect to a predetermined reference value.

2. The vibration-type angular velocity sensor according to claim 1, wherein
the primary side control circuit and the secondary side control circuit respectively include a primary side loop filter and a secondary side loop filter in the closed control loop, and
are configured to correct the sensor output by adding the offset value to an input of the secondary side loop filter of the secondary side control circuit.

3. The vibration-type angular velocity sensor according to claim 1, wherein
when the offset value before interchange is set to a, the offset value after interchange is −a in which a polarity of the offset value before interchange is reversed.

4. The vibration-type angular velocity sensor according to claim 1, wherein
when a temporary offset value before interchange is set to a,
a temporary offset value after interchange is set to −a, and
a temporary offset value with respect to a median value between the sensor output before interchange and the sensor output after interchange is set to b,
the offset value before interchange is a +b, and the offset value after interchange is −a +b.

5. The vibration-type angular velocity sensor according to claim 1, wherein
a configuration is made so that, when the sensor output is corrected in an analog manner, the sensor output is corrected by adding a first offset value based on the output of the primary side control circuit inversely proportional to a temperature change of a gain of the vibrator in order to correct the sensor output inversely proportional to a square of the temperature change of the gain of the vibrator from the secondary side control circuit and a second offset value based on a constant signal independent of temperature in order to correct the sensor output inversely proportional to the temperature change of the gain of the vibrator from the secondary side control circuit in the closed control loop of the secondary side control circuit, and by adjusting an addition amount of the first offset value and an addition amount of the second offset value.

6. The vibration-type angular velocity sensor according to claim 5, wherein
a configuration is made so that, when the gain of the vibrator dependent on temperature is $G_R(T)$ and A, B, and C are constant values independent of temperature, a total $V_{Out\_Total\_Error}$ of an error of the sensor output generated in the closed control loop of the secondary side control circuit due to an error signal generated from a circuit block constituting the secondary side control circuit and an error of the sensor output generated in the closed control loop of the secondary side control circuit due to crosstalk from the primary side control circuit to the secondary side control circuit is expressed in the following Equation, and the sensor output is corrected in the analog manner by adjusting the addition amount of the first offset value based on the output of the primary side control circuit dependent on temperature inversely proportional to the temperature change of the gain of the vibrator so as to reduce $A/G_R^2(T)$ which is a first term of the following Equation and adjusting the addition amount of the second offset value based on the constant signal independent of temperature so as to reduce $B/G_R(T)$ which is a second term of the following Equation $$V_{Out\_Total\_Error} = A \cdot \frac{1}{G_R^2(T)} + B \cdot \frac{1}{G_R(T)} + C. \quad \text{[Equation 1]}$$

7. The vibration-type angular velocity sensor according to claim 1, wherein
a configuration is made so that, when the sensor output is corrected in a digital manner, the sensor output is corrected by quantizing the output of the primary side control circuit dependent on temperature inversely proportional to a temperature change of a gain of the vibrator and by adding the offset value, which reduces an error of the sensor output due to the temperature change with respect to the quantized output of the primary side control circuit, to the secondary side control circuit.

8. The vibration-type angular velocity sensor according to claim 1, wherein the vibrator includes a ring-type vibrator.

9. A vibration-type angular velocity sensor comprising:
a vibrator;
a primary side control circuit that has a closed control loop, an output of the closed control loop inducing primary vibration in the vibrator; and
a secondary side control circuit that has a closed control loop which detects secondary vibration generated in the vibrator due to an angular velocity applied to the vibrator, and is configured to correct a sensor output by adding an offset value to the closed control loop of the secondary side control circuit, wherein
a configuration is made so that a function of inducing the primary vibration and a function of detecting the secondary vibration are interchangeable, and
after interchanging the functions of the primary side control circuit and the secondary side control circuit, an offset value added to the closed control loop of the primary side control circuit after interchange and the offset value added to the closed control loop of the secondary side control circuit before interchange are symmetric values with respect to a predetermined reference value.

10. The vibration-type angular velocity sensor according to claim 9, wherein
the primary side control circuit and the secondary side control circuit respectively include a primary side loop filter and a secondary side loop filter in the closed control loop, and
are configured to correct the sensor output by adding the offset value to an input of the secondary side loop filter of the secondary side control circuit.

11. The vibration-type angular velocity sensor according to claim 9, wherein
when the offset value before interchange is set to a, the offset value after interchange is −a in which a polarity of the offset value before interchange is reversed.

12. The vibration-type angular velocity sensor according to claim 9, wherein
when a temporary offset value before interchange is set to a,
a temporary offset value after interchange is set to −a, and
a temporary offset value with respect to a median value between the sensor output before interchange and the sensor output after interchange is set to b,
the offset value before interchange is a +b, and the offset value after interchange is −a +b.

13. The vibration-type angular velocity sensor according to claim 9, wherein
a configuration is made so that, when the sensor output is corrected in an analog manner, the sensor output is corrected by adding a first offset value based on the output of the primary side control circuit inversely proportional to a temperature change of a gain of the vibrator in order to correct the sensor output inversely proportional to a square of the temperature change of the gain of the vibrator from the secondary side control circuit and a second offset value based on a constant signal independent of temperature in order to correct the sensor output inversely proportional to the temperature change of the gain of the vibrator from the secondary side control circuit in the closed control loop of the secondary side control circuit, and by adjusting an addition amount of the first offset value and an addition amount of the second offset value.

14. The vibration-type angular velocity sensor according to claim 13, wherein
a configuration is made so that, when the gain of the vibrator dependent on temperature is $G_R(T)$ and A, B, and C are constant values independent of temperature, a total $V_{Out\_Total\_Error}$ of an error of the sensor output generated in the closed control loop of the secondary side control circuit due to an error signal generated from a circuit block constituting the secondary side control circuit and an error of the sensor output generated in the closed control loop of the secondary side control circuit due to crosstalk from the primary side control circuit to the secondary side control circuit is expressed in the following Equation, and the sensor output is corrected in the analog manner by adjusting the addition amount of the first offset value based on the output of the primary side control circuit dependent on temperature inversely proportional to the temperature change of the gain of the vibrator so as to reduce $A/G_R^2(T)$ which is a first term of the following Equation and adjusting the addition amount of the second offset value based on the constant signal independent of temperature so as to reduce $B/G_R(T)$ which is a second term of the following Equation.

$$V_{Out\_Total\_Error} = A \cdot \frac{1}{G_R^2(T)} + B \cdot \frac{1}{G_R(T)} + C \quad \text{[Equation 2]}$$

15. The vibration-type angular velocity sensor according to claim 9, wherein a configuration is made so that, when the sensor output is corrected in a digital manner, the sensor output is corrected by quantizing the output of the primary side control circuit dependent on temperature inversely proportional to a temperature change of a gain of the vibrator and by adding the offset value, which reduces an error of the sensor output due to the temperature change with respect to the quantized output of the primary side control circuit, to the secondary side control circuit.

\* \* \* \* \*